United States Patent [19]
Koeppel

[11] Patent Number: 5,253,767
[45] Date of Patent: Oct. 19, 1993

[54] ROTATABLE DISPLAY TOWER FOR COMPACT DISCS AND THE LIKE

[75] Inventor: Lloyd Koeppel, North Freedom, Wis.
[73] Assignee: Gressco, Ltd., Waunakee, Wis.
[21] Appl. No.: 806,720
[22] Filed: Dec. 12, 1991
[51] Int. Cl.⁵ ............................................. A47G 29/00
[52] U.S. Cl. ................................. 211/40; 211/144; 211/188
[58] Field of Search ............... 211/40, 41, 134, 163, 211/78, 135, 188, 144; D6/407

[56] References Cited

U.S. PATENT DOCUMENTS

| | | | |
|---|---|---|---|
| D. 187,929 | 5/1960 | Rensch | D6/407 X |
| D. 243,042 | 1/1977 | Dorn | D6/407 |
| 734,995 | 7/1903 | Sullivan | 211/163 |
| 1,381,525 | 6/1921 | Wagoner et al. | 211/169 X |
| 1,569,365 | 1/1926 | Goldberg | 211/163 |
| 2,707,350 | 5/1955 | Schaffner | 248/458 |
| 3,149,726 | 9/1964 | Magers | 211/134 |
| 3,181,706 | 5/1965 | Mandel | 211/169 X |
| 3,315,819 | 4/1967 | Kingsberry | 211/163 |
| 3,335,874 | 8/1967 | Levy et al. | 211/135 X |
| 3,337,059 | 8/1967 | Le Hoy | 211/169 X |
| 3,908,832 | 9/1975 | Marshall | 211/134 X |
| 3,938,665 | 2/1976 | Rumble | 211/163 X |
| 4,102,458 | 7/1978 | Fors | 211/169 X |
| 4,867,306 | 9/1989 | Factor | 211/169 X |
| 5,027,955 | 7/1991 | Shoemaker, Jr. et al. | 211/40 |
| 5,031,780 | 7/1991 | Lemmerman et al. | 211/135 X |
| 5,052,564 | 10/1991 | Zuzack | 211/40 |

Primary Examiner—David A. Scherbel
Assistant Examiner—Korie H. Chan
Attorney, Agent, or Firm—Henry R. Lerner

[57] ABSTRACT

A rotatable display tower, preferably for use as a merchandising rack for the original sale of packaged products, preferably compact discs. The tower provides, in a relative minimum of space, a large number of compact discs to be viewed "head or face on." The display tower securely holds the packages, in a tilted-back manner, yet allows the consumer to easily remove the same for purchase.

6 Claims, 4 Drawing Sheets

ROTATABLE DISPLAY TOWER FOR COMPACT DISCS AND THE LIKE

BACKGROUND OF THE INVENTION

The present invention relates to a rotatable display tower for use in connection with merchandising or mere display for browsing of paperback books, compact audio discs, audio and video cassette tapes and LP records, etc. In a relative minimum of space, the present invention provides for the attractive display of a large quantity of articles sought to be merchandised, displayed and/or sold. The rotatable display tower is preferably held on a stationery support base. The consumer stands in a single position and rotates the display tower about its central vertical axis in order to view all of the available articles of merchandise contained on the rack. A wide variety or selection is thus viewable in a small floor area with maximum convenience to the consumer.

The preferred embodiment of the present invention contemplates that the display tower is supported by one or more I-frames, as disclosed in my co-pending patent application filed even date herewith and now U.S. Pat. No. 5,226,548. It is an object of the present invention to display a plurality of articles for rent, borrowing or sale, preferably, audio or video cassette tapes or compact discs, in such a manner that a substantial number of the face portions of the packaging for the cassette tapes or compact discs are simultaneously visible to the potential consumer. The front or face portion of the packaging for compact discs and cassette tapes are frequently provided with visually attractive artwork, and in addition, the title of the "work" and the group or individual singer performing thereon. Thus, display of the front face is highly desirable for effective merchandising of the product. The present invention displays the merchandise in a highly attractive manner, using a minimum of floor space, in a relatively inexpensive manner and with convenience to the browsing consumer.

DESCRIPTION OF THE PRIOR ART

U.S. Pat. No. 3,844,230 to Hudson et al. shows a display rack or tower for paperback books. According to the specification of that patent, a paperback book displayer provides, in a relatively simple and compact form, a large capacity for displaying various articles of merchandise. The displayer shown therein basically includes one or more towers which are freely rotatable about a common vertical central axis with each tower including a multiple series of vertically spaced shelves or platforms arranged in tiers of any desired number of book supporting shelves. According to the description of the device shown in the Hudson et al. patent, the spines and many of the front covers of the books displayed on the shelves are simultaneously visible. This is, of course, an extremely important aspect of successful merchandising of these products.

So, too, the present invention contemplates providing a rotatable display tower for audio and/or video cassette tapes, compact discs, LP records, paperback books, etc. (hereinafter often collectively referred to for convenience as "displayed merchandise"). The consumer can rotate the tower about its vertical central axis. The spines of the outermost displayed merchandise as well as all of the front faces for the displayed merchandise are viewable. The displayed merchandise are securely held yet easily removable for purchase. Visibility is highly desirable since sales of the merchandise are, to a large degree, directly dependent on the consumer's appreciation of the information (art work, title or work, authors/artists, etc.) of the article sought to be merchandised, most of the information being conveyed on the front face of the displayed merchandise, with some information on the spine.

The preferred embodiment of the present invention contemplates the display of packaged audio compact discs and, accordingly, the present invention will be described with respect thereto, although it should be appreciated that the displayed merchandise which can be held by the rotatable tower of the present invention can also be audio or video cassette tapes, LP records, paperback books, hard cover books, and other similar merchandise.

SUMMARY OF THE INVENTION

The present invention relates to a rotatable display tower for compact discs, audio or video cassettes, LP records, paperbacks, hard cover books, etc. At least with respect to audio compact discs and audio and video cassette tapes, these are generally sold in protective and visually attracting boxes or packaging. The present invention provides a display tower for supporting the packaged merchandise.

The present invention, a display tower, is rotatable about a central vertical axis to allow the potential consumer to stand in one location and, yet, by rotating the display tower, a large quantity of available merchandise can be viewed. According to the invention, the vertically spaced shelves or tiers of the display tower securely hold the displayed merchandise in a slant back or tilt-back position. This is believed to provide a visually superior orientation for browsing and/or generating sales by potential purchasers. In addition, the present invention contemplates that the individual articles of merchandise are fully viewed face-on. The displayed merchandise is securely held in the tower's many pockets so that all of the fronts or faces of the packaged goods can be viewed. Also, many of the spines of the displayed merchandise are also able to be seen, at the same time.

In the embodiment of the present invention relating to the display of packaged audio compact discs, the spines are not nearly as important from a merchandising point of view as the faces or fronts but, rather, the faces of the packaging, bearing the appropriate identifying and visually attracting information, are more critical to the merchandising of the product. Accordingly, all of the front faces of the packaged compact discs are viewable. The present invention provides a rotatable display tower comprising a plurality of stacked shelves, each of which carries a plurality of displayed merchandise. The shelves comprise radially extending arms which support the packaged compact discs in individual "pockets".

It is an object of the present invention to support the displayed merchandise, securely, between vertically opposed pairs of radially extending arms of the shelves and, yet, when a consumer desires to purchase an article of merchandise, the item can be easily removed from the display tower by a simple manipulation of the merchandise with respect to the display tower.

It is a further object of the present invention to construct a display tower comprising a plurality of vertically spaced shelves or tiers which are substantially identical to one another. The shelves comprise radially extending arms; each shelf or radially extending set of arms being substantially identical to the shelves or radially extending arms located above and/or below it. Thus, a merchandiser can assemble a rotatable display tower in a wide range of heights using the modular-like shelves, stacking the tiers one upon another. This allows the displayer to merchandise a wide range of articles of merchandise.

These, and other objects of the present invention, are accomplished and will be more easily understood with reference to the accompanying set of drawings, which are described herein.

DETAILED DESCRIPTION OF THE INVENTION AND THE PREFERRED EMBODIMENT

Figure 1:
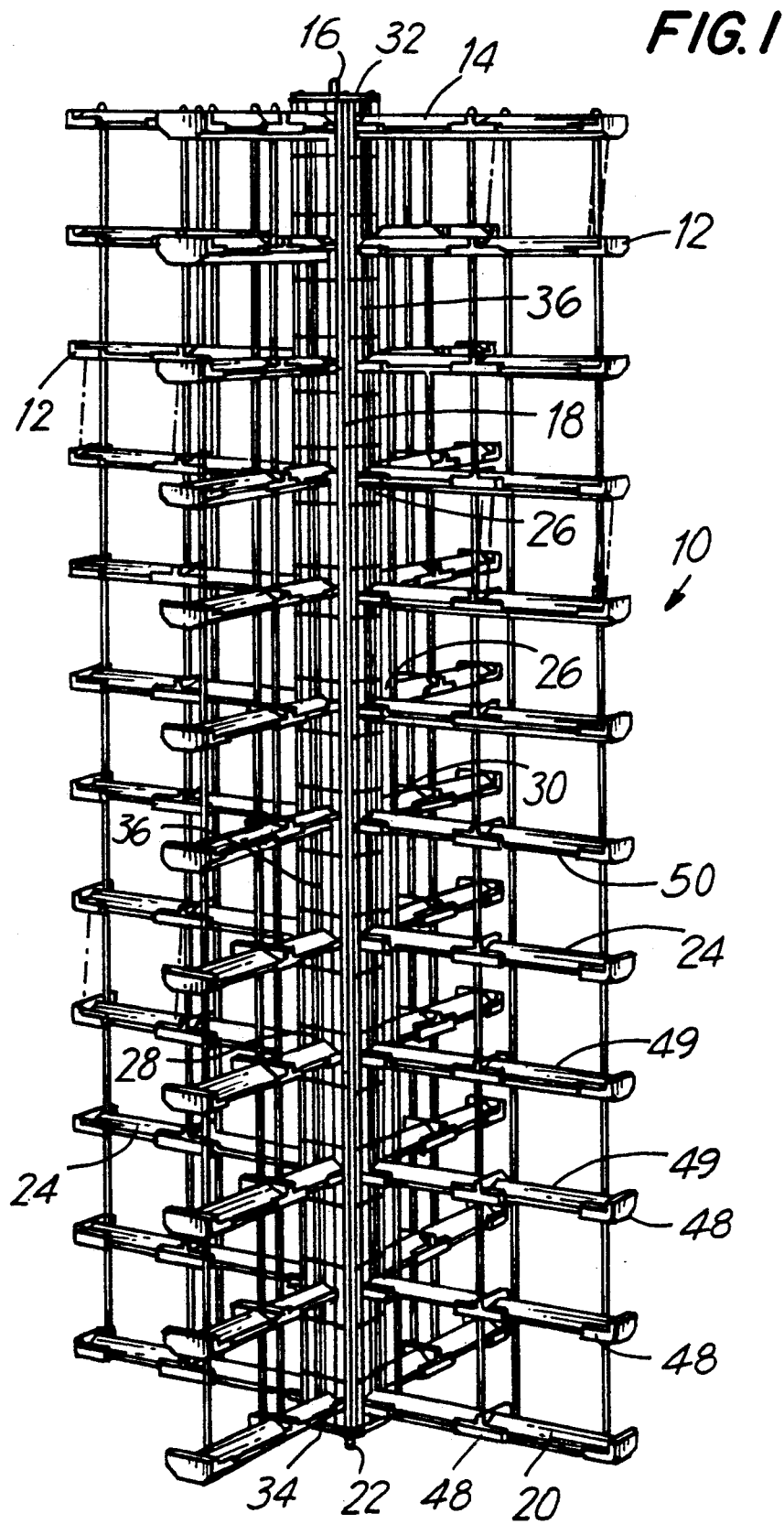
FIG. 1 is an elevational perspective view of a tower embodying the preferred embodiment of the present invention.

As best seen in FIG. 1, a display tower generally referred to as 10 comprises a plurality of shelves or tiers 12, which are vertically spaced or stacked one upon another. In the illustrated embodiment, twelve tiers are provided to form a single tower about 5' in overall height. The display tower 10 can be turned about central rotative axis 18 for allowing a potential consumer to turn the display tower. A top shelf 14 has the exposed end 16, of the central rotative axis 18 passing therethrough. The bottom shelf 20 similarly has an exposed end 22 of the central rotative axis 18 projecting downwardly therethrough. Exposed end 22, along with exposed end 16 of central rotative axis 18, provide the mechanical interconnection of the display tower 10 with a base or support structure. When the tower 10 is rotatively held in a base or support structure, the entire tower 10 can rotate about the central rotative axis 18.

In the preferred embodiment of the present invention, two or more display towers 10 are rotatively supported in at least one I-shaped frame. The I-frames provide pairs of opposed bearing structures for holding therebetween exposed end 16 and lowermost exposed end 22. With the central rotative axis 18 aligned with the bearing structures of the I-frame, the display tower 10 is adapted for rotation by a consumer. In this connection, the teachings, drawings and description of my invention for an I-frame tower support is incorporated herein by reference. That application is co-pending and has now become U.S. Pat. No. 5,226,548.

The tower of the present invention, however, can be supported on any support or base so long as the tower is allowed to rotate about its central axis 18.

Each tier or shelf 12, according to the preferred embodiment, is provided with four outwardly, radially extending arms 24. When four arms are provided, they extend perpendicularly to one another, extending away from the central rotative axis 18. The outwardly, radially extending arms 24 are secured to or integrally molded with planar surfaces 26, four of which, together, form a box-like structure 28. Structure 28 is non-rotatively secured to the central rotative axis 18 so that when the axis 18 rotates, the arms 24 rotate. A top plate 32 and bottom plate 34 physically "close-off" the openings of the box-like structures 28, when vertically stacked. Top plate 32 and bottom plate 34 prevent dust or other particles from becoming entrapped within the interior of the box-like structures 28 formed, as mentioned, by the planar surfaces 26. It will be appreciated that the exposed end 16 of axis 18 extends through a centrally located aperture in top plate 32, while the lowermost exposed end 22 extends though an aligned central aperture passing through bottom plate 34.

Planar spacers 36, four of which together form spacing boxes, are vertically interposed between stacked box-like structures 28 and serve to space one shelf or tier 12 from its immediately above or below shelf or tier 12. As will be appreciated by a review of the drawings, each associated pair of immediately adjacent shelves or tiers 12 provides a plurality of merchandise holding pockets. The shelves secure and display an article of merchandise, preferably, packaged compact discs (PCDs, for short). Each shelf or tier provides a bottom support for the lowermost edge of the PCD and, immediately beneath, the very same shelf or tier correspondingly provides a top support for a PCD held immediately below it; that PCD being supported from below by another shelf. Of course, it should be easily understood that top shelf 14 only provides top support for a compact disc held beneath it and does not provide bottom support for any PCD held above it. Similarly, bottom shelf 20 only provides bottom support for a PCD supported above it and does not provide top support for a PCD held beneath it.

Figure 5:
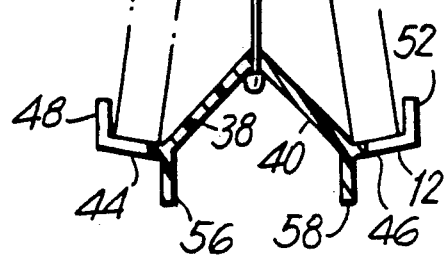
FIG. 5 is a cross-sectional view taken along lines 5—5 of FIG. 3 and shows the packaged compact discs (hereinafter referred to, more simply, as the compact discs, themselves) in phantom detail supported within the pocket portions of the vertically spaced pair of shelves shown in FIG. 3.
Figure 3:
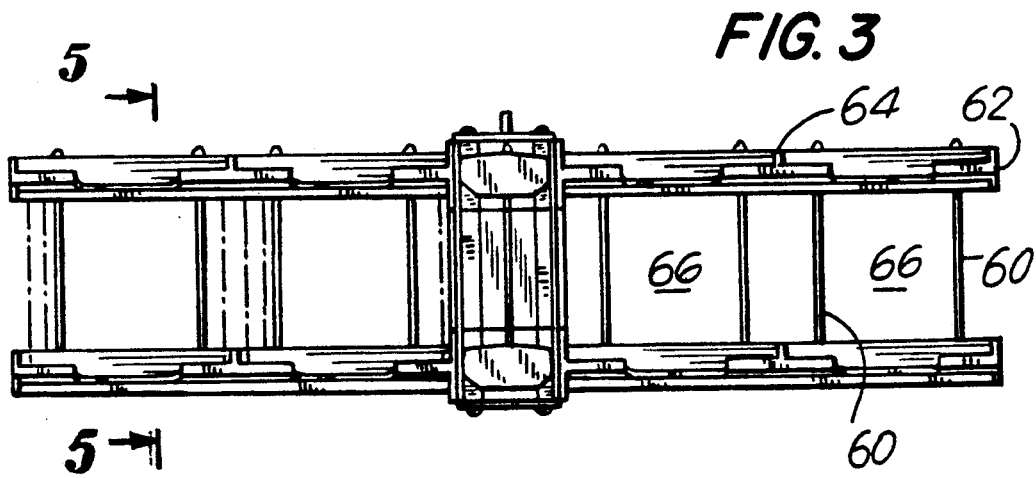
FIG. 3 is a side elevational view of a portion of the display tower shown in FIG. 1, this figure showing a pair of vertically spaced shelves or sets of arms with a few packaged compact discs shown in phantom detail.
Figure 4:
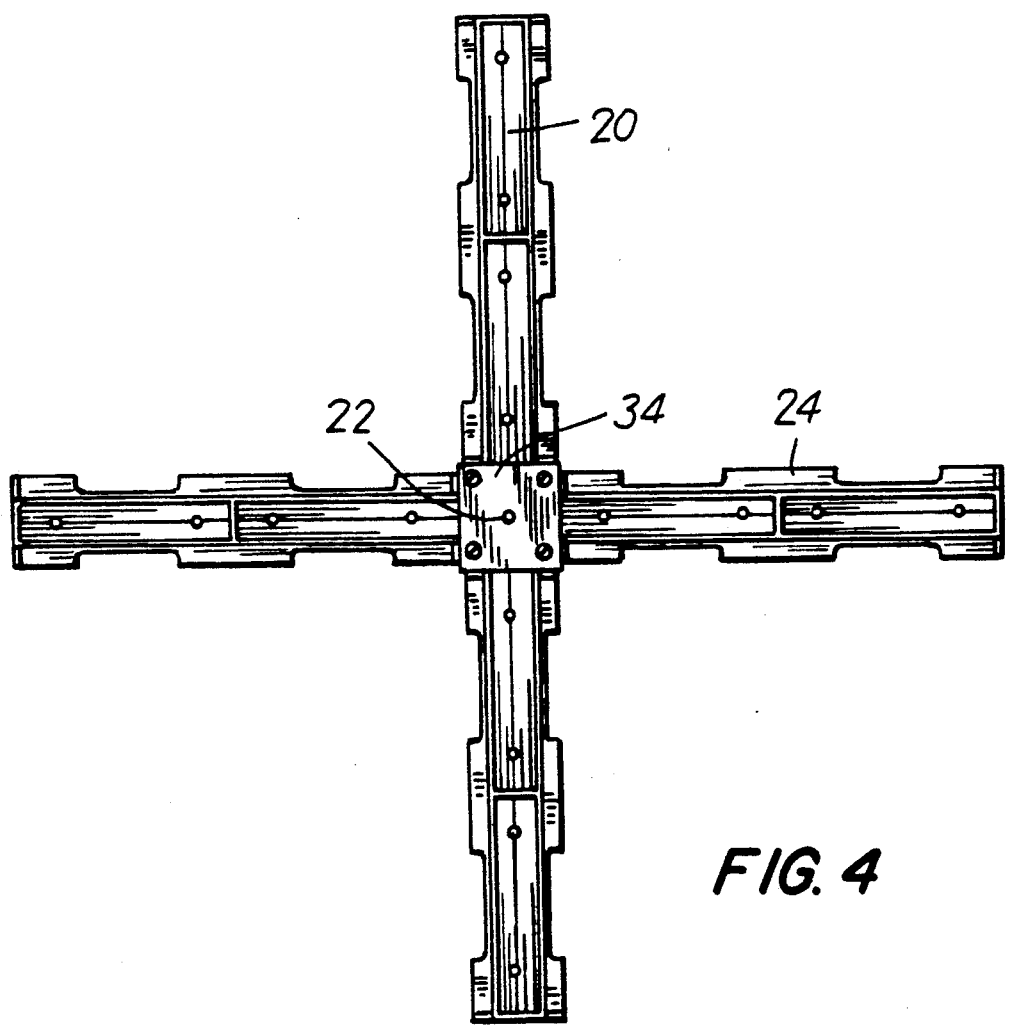
FIG. 4 is a bottom plan view of the display tower shown in FIG. 1.
Figure 6:
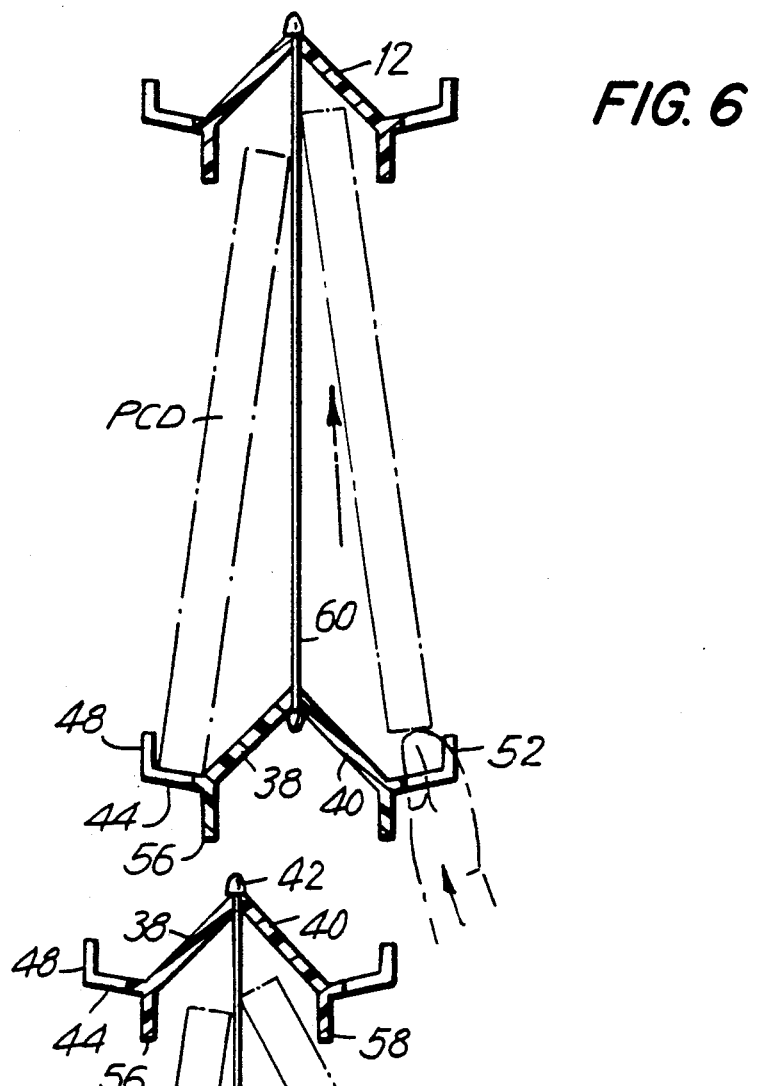
FIG. 6 is a cross-sectional view, similar to that shown in FIG. 5 and shows, again, in phantom detail the manual steps for removal of a compact disc by an individual's fingers, partially shown in phantom detail.
Figure 7:
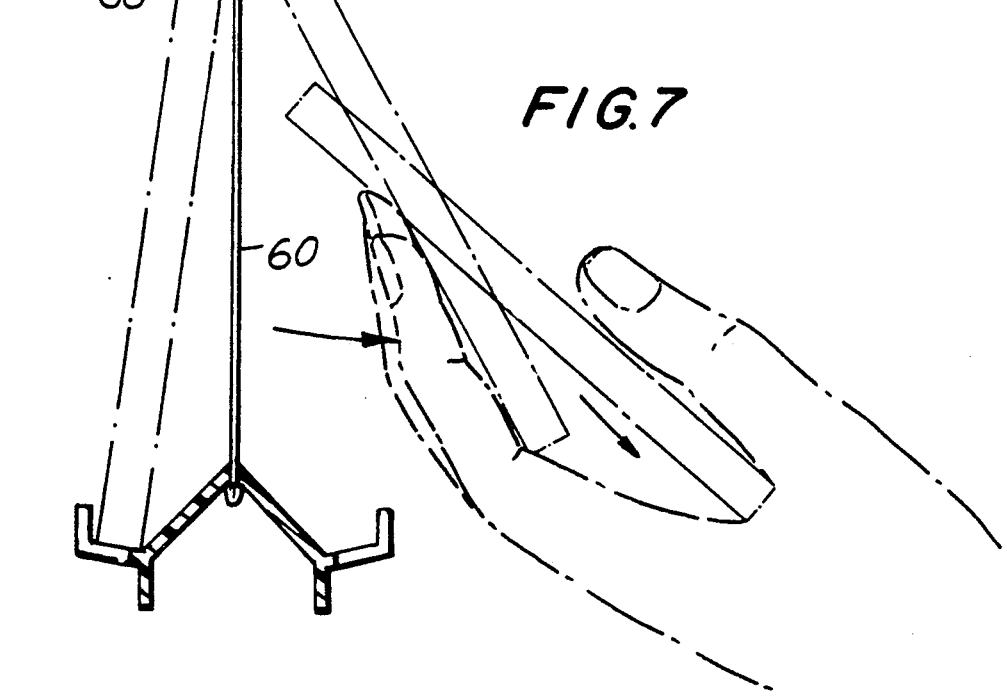
FIG. 7 is a cross-sectional view, again, similar to that shown in FIGS. 5 and 6 and shows the completion of the manual removal of the compact disc from the pair of vertically spaced shelves of the present invention, again, with the compact disc and the fingers of the individual removing the same, shown in phantom detail.

As best seen in FIGS. 5, 6 and 7, in cross-section, an arm 24 of a shelf or tier 12, preferably integrally molded from plastic, comprises a pair of opposed, downwardly and outwardly deflected walls 38 and 40, which meet at a common peak 42. Projecting outwardly and slightly upwardly from opposed wall 38 is a bottom support surface 44. Similarly, extending outwardly and slightly upwardly, from opposed wall 40, is an opposed bottom support surface 46. As can best be seen in FIG. 5, the bottom support surface and opposed bottom support surface, 44 and 46, respectively, provide support for the base portion of the PCD.

Figure 2:
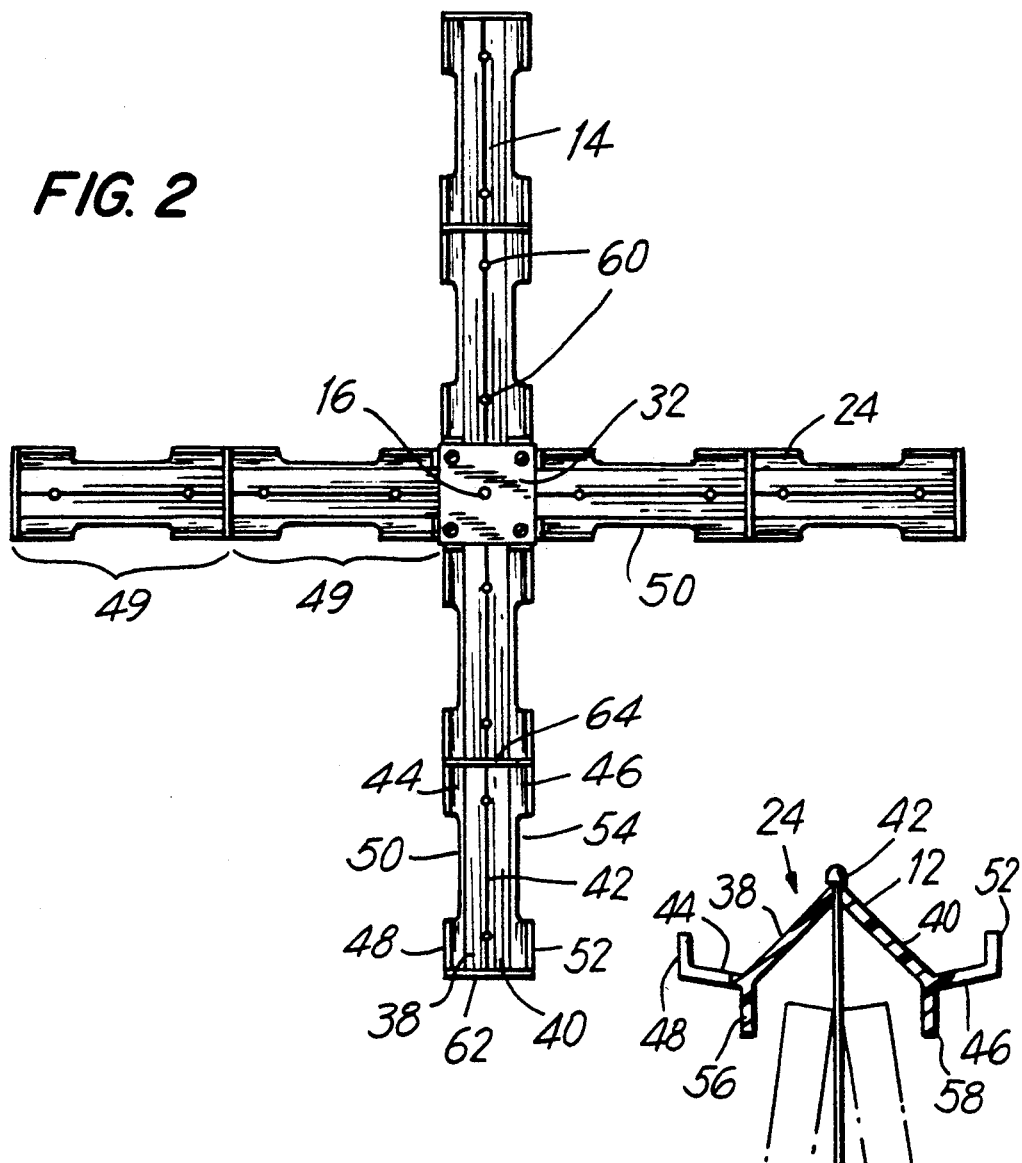
FIG. 2 is a top plan view of the display tower of the present invention shown in FIG. 1.

An upwardly extending leg 48 is integrally formed with the outermost end of bottom support 44. As best seen in FIG. 2, upwardly extending leg 48 does not, necessarily, extend across the entire width of the pockets 49 of the shelf 12 but, rather, is provided with a recess or convenient hand hold 50, separating the segments of the upwardly extending leg 48. Similarly, opposed upwardly extending leg 52 is integrally formed at the outermost end of opposed bottom surface 46. An opposed recess or hand hold 54 (see FIG. 2), similar to hand hold or recess 50, is provided and separates opposed upwardly extending leg 52 into segments. As can best be appreciated by a review of the bottom portion of FIGS. 5, 6 and 7, the opposed upwardly extending leg 52 and the upwardly extending leg 48 block the PCD from accidentally or inadvertently falling out of opposed bottom support surface 46 and bottom support surface 44, respectively, at least until the PCD is first manually lifted upwardly a sufficient distance until the bottom of the PCD clears leg 48 and opposed leg 52. The manual movements required for the intentional removal of the PCD is best understood by reference to FIGS. 6 and 7.

At the intersection of bottom support surface 44 and opposed wall 38, extending directly downwardly, is top barrier leg 56. Similarly, extending downwardly, at the intersection between opposed wall 40 and opposed bottom support surface 46, is opposed top barrier leg 58. Top barrier leg 56 and opposed top barrier leg 58 extend downwardly from bottom support 44 and opposed bottom support surface 46, respectively, a sufficient distance such that the PCD will not accidentally or inadvertently fall off of the display tower. The distance between bottom surface 44 or opposed bottom support surface 46 and the underside of opposed wall 38 or opposed wall 40, respectively, is sufficient such that a PCD can be inserted into the pockets 49 formed thereby, with the PCD's bottom held on the bottom support 44 or opposed bottom support 46 and the tops of the PCD extending vertically beyond the lowermost portion of top barrier leg 56 or opposed top barrier leg 58. The spacing between shelves or tiers 12 is such that the PCD, when desirably removed from the display tower 10, must be first manually lifted upwardly such that the top of the PCD goes into the space defined below opposed walls 38 or 40 and, then, the lowermost end of the PCD can clear upwardly extending leg 48 or opposed upwardly extending leg 52, respectively. The distance, then, between the top of a PCD and opposed wall 38 must be greater than the upward extension or length of extending leg 48. This dimensioning facilitates easy placement and removal of PCD's on the shelves, while securely holding the PCD's until intentionally removed. The insertion of new or additional PCD's into the display tower, for merchandising purposes, is the exact reverse manual steps shown in FIGS. 6 and 7 for removal of a PCD.

A plurality of thin metal rods 60 pass through the peaks 42 of the shelves 12. The rods 60 are spaced and, according to the preferred embodiment, two rods 60 are provided for supporting the backs of a pair of opposed PCDs. According to the preferred embodiment of the present invention, a pair of rods 60 are inwardly spaced from the end walls 62 and 64 of the pockets 66. The backwardly tilted PCDs lean against the rods (see FIGS. 5, 6 and 7) and prevent the PCDs from rearwardly falling out of the display tower. The use of the rods, preferably metal, allows for a more "open" visual display rack having more light transmission through the tower. A single pair of rods 60, for each pair of back to back pockets 66, provides rearward support for a pair of opposed PCDs held in the pockets.

As can best be seen in FIG. 1, in the preferred embodiment, the outwardly radially extending arms 24 extend a distance to accommodate a pair of laterally spaced individual support pockets 66. It should be appreciated that more than two of such individual support pockets 66, for each arm 24, can be provided. If additional individual support pockets 66 are desired for each pair of vertically opposed, radially outwardly extending arms 24, the arms can be lengthened, outwardly from the central rotative axis 18 and pockets comprising end walls 62 and 64 having support surfaces, extending legs and barrier legs are molded, identical to those previously described.

As can best be appreciated by a review of the drawings and the description, the person seeking to display PCDs has the flexibility, with the present described display tower, to design and assemble shelves, with the planar spacers 36, to construct a display tower according to the desired height of the tower, consistent with the variety of merchandise to be displayed.

Referring now to FIGS. 6 and 7, there is shown the nature of the manipulation which enables an individual compact disc to be removed from the tower.

The compact disc is lifted from the bottom on the tip of the pointer and middle fingers. In this connection it will be noted that much of the bottom of the compact disc is exposed by the recess 54, as best shown in FIG. 2. The compact disc is lifted by the fingers until it clears the vertical legs 48 and 52 as best shown in FIG. 6. Once the compact disc is clear of these legs 48 and 52 the bottom of the compact disc is swung out and away, as best shown in FIG. 7.

There is a natural tendency for the hand and fingers to cup slightly as the compact disc is withdrawn. Such cupping of the hand creates a ramp which causes the compact disc to slide toward and drop into the palm of the hand. The thumb then easily traps the compact disc between it and the extended fingers of the hand.

In order to insert the compact disc into the rack, the steps described above are performed in reverse order.

Obviously, numerous variations of the above described structure can occur to those of skill in the art. The invention is not to be limited to that described. The claims which follow, as the same are interpreted by the Courts, is the true scope of this invention.

I claim:

1. A rotatable merchandise display tower for a box-like container of merchandise for rotation on a stationary support base comprising at least two identical, vertically spaced shelves having aligned axis of rotation, mounting means on each of the shelves for supporting the selves on top of one another, each of said shelves comprising two or more radial arms extending from said mounting means, each of said arms of said shelves having a pair of sloped walls extending downwardly and outwardly in opposite directions from a common peak, said sloped walls having a bottom edge, spaced metal rods extending from the peak of a first of said arms of a first of said shelves to the peak of an arm located immediately above the first of said arms, said metal rods disposed in a vertical plane passing through said peaks of said first arm and said arm immediately above, and a bottom support surface extending upwardly and outwardly from said bottom edge of said opposed sloped walls; said rods and said bottom support surfaces providing tilted back support to said container; said metal rods, said opposed slope walls, and said bottom support surfaces of said first arm cooperating with said opposed slope walls of said arm located immediately above to define two opposed merchandise holding pockets on either side of said peak, each of said pockets being substantially open to allow said container of merchandise to be viewed face-on, an uppermost of said vertically spaced shelves having an upwardly extending exposed end on said mounting means of said uppermost shelf coaxial with said axis of rotation and a lowermost of said vertically spaced shelves having a downwardly extending exposed end on said mounting means of said lowermost shelf co-axial with said axis of rotation, said exposed ends receivable in said stationary support base for enabling the display tower to be supported for rotational movement.

2. A rotatable merchandise display tower as claimed in claim 1 wherein said bottom support wall is provided with an upwardly extending leg for selectively blocking unintentional removal of said merchandise from said pocket.

3. A rotatable merchandise display tower as claimed in claim 1 wherein said display tower can accommodate merchandise whose height is less than the distance between said bottom support wall of said first of said arms and the peak of said opposed sloped wall of the arm immediately above said first of said arms.

4. A rotatable merchandise display tower as claimed in claim 1 wherein said display tower can accommodate merchandise whose height is greater than the distance between said bottom support wall of said first of said arms and the lowermost portion of the opposed sloped wall of the arms immediately above said first of said arms.

5. A rotatable merchandise display tower as claimed in claim 1 wherein said opposed sloped walls extend downwardly form said common peak and a bottom surface of said sloped walls is provided with a top barrier leg for further retaining a top of the container.

6. A rotatable merchandise display tower as claimed in claim 5 wherein the display tower can accommodate merchandise whose height is greater than the distance between the said bottom support wall of said first of said arms and said top barrier leg of the arm immediately above said first of said arms.

* * * * *